May 10, 1960  S. C. SHAPPELL  2,936,361
WELDING APPARATUS
Filed Dec. 1, 1958  7 Sheets-Sheet 1

INVENTOR
STANLEY C. SHAPPELL
BY
ATTORNEY

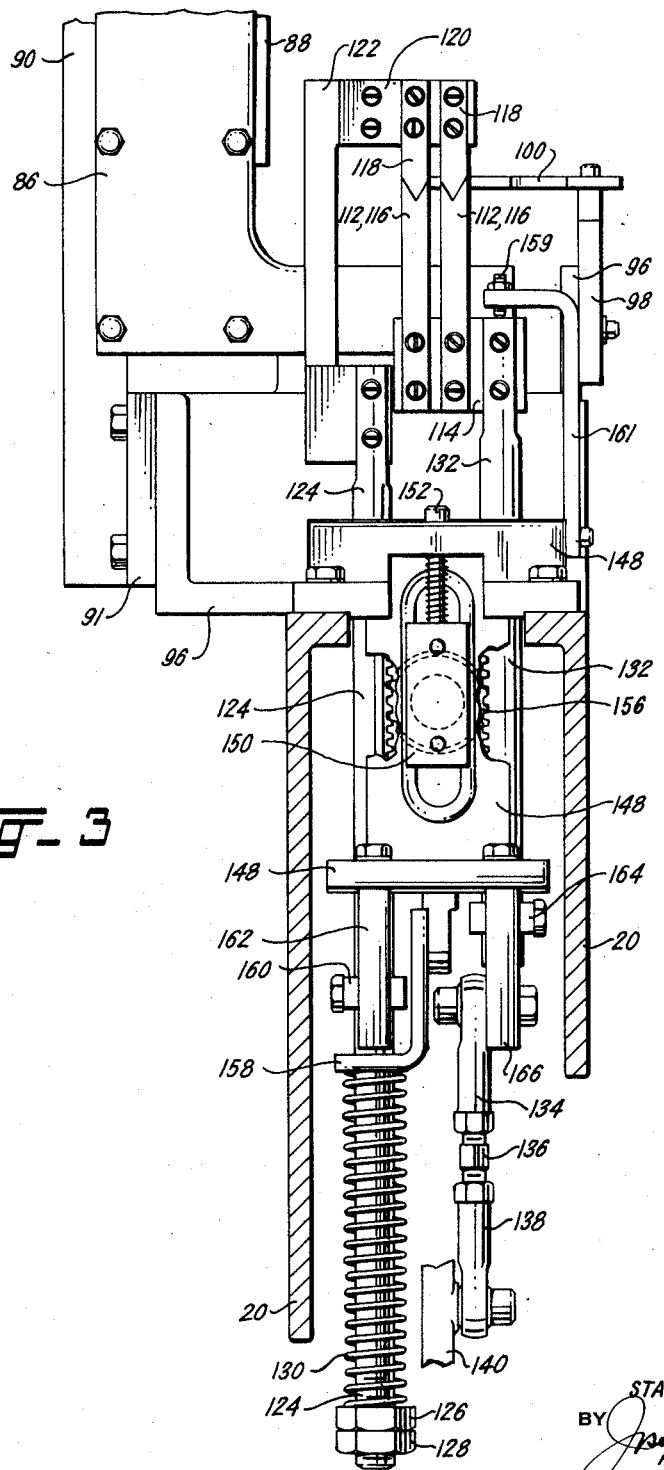

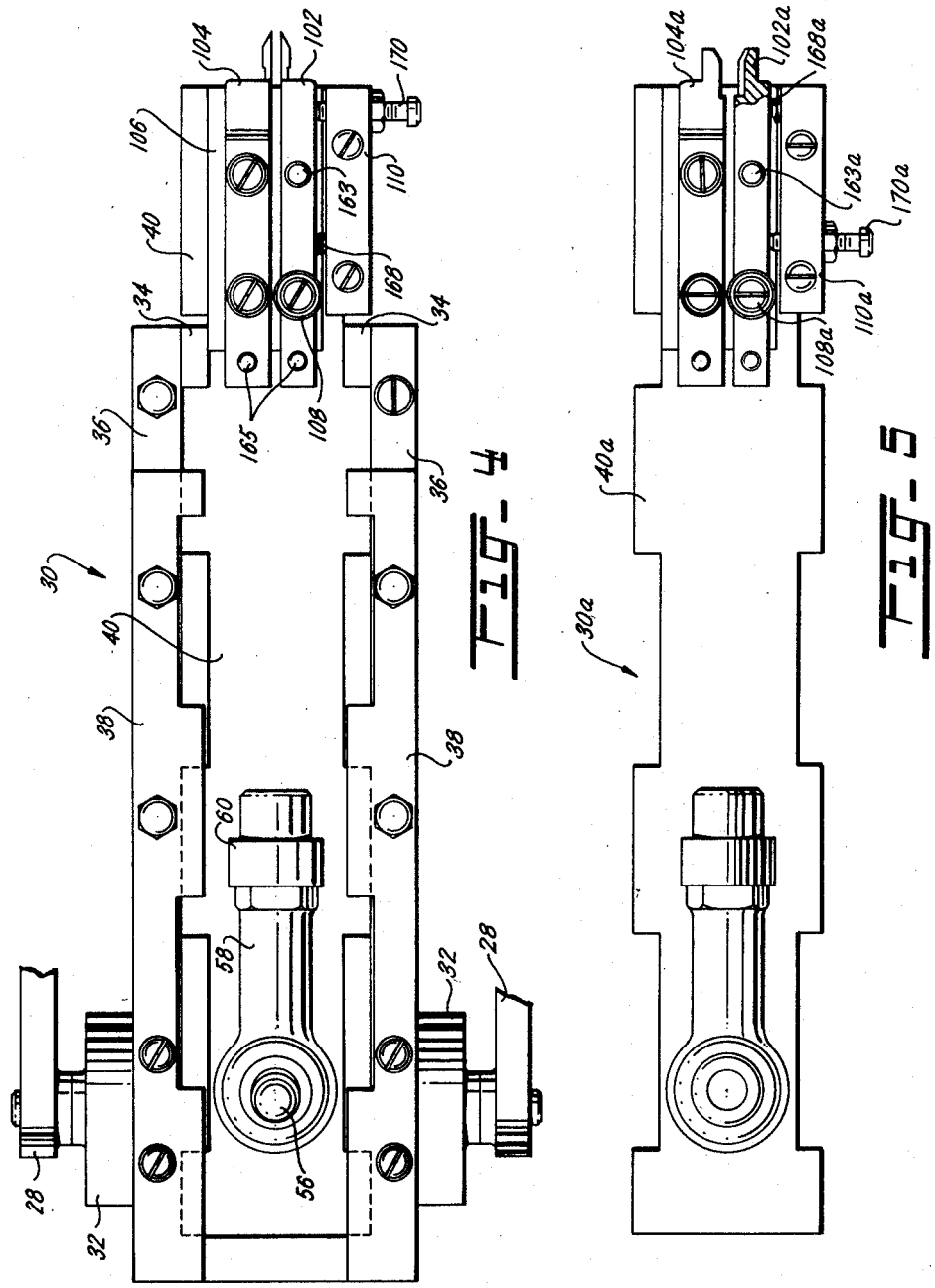

May 10, 1960 S. C. SHAPPELL 2,936,361
WELDING APPARATUS
Filed Dec. 1, 1958 7 Sheets-Sheet 5

INVENTOR
STANLEY C. SHAPPELL
BY Joseph C. Ryan
ATTORNEY

May 10, 1960

S. C. SHAPPELL 2,936,361

WELDING APPARATUS

Filed Dec. 1, 1958

INVENTOR
STANLEY C. SHAPPELL
BY
ATTORNEY

United States Patent Office 2,936,361
Patented May 10, 1960

2,936,361

WELDING APPARATUS

Stanley C. Shappell, West Boxford, Mass., assignor, by mesne assignments, to Sylvania Electric Products Inc., Wilmington, Del., a corporation of Delaware Application December 1, 1958, Serial No. 777,397

7 Claims. (Cl. 219—78)

This invention relates to the manufacture of electrical devices and more particularly to the welding of one or more lead-in wires projecting therefrom to an electrical contact member disposed interiorly of a base or cap with which the device is provided.

In the manufacture of fluorescent lamps for example, one or more lead-in wires extending from each end of a sealed tubular envelope is secured to an electrical contact member which constitutes part of a base which is in turn affixed to each end of the lamp envelope. In accordance with the principles of the invention described in the copending application of Wiley et al., entitled "Welding Method," Serial Number 763,509, filed September 26, 1958, a lead-in wire extending from an electrical device is welded to an electrical contact member of a base or cap interiorly thereof. In accordance with the principles of this invention, an apparatus is provided for practicing the invention described in the said Wiley et al. application.

In the specific embodiment of the invention illustrated in the accompanying drawings, Figure 1 is a side elevational view of one embodiment of the apparatus.

Figure 3 is a front elevational view of the apparatus of Figure 1 with a portion of the framework on which it is mounted broken away for clarity of illustration.

Figure 4 is a plan view of the slide assembly, showing particularly the welding electrodes and their associated parts employed when a recessed double contact type of base is used.

Figure 5 is a plan view of a slide assembly, similar to Figure 4 but with the slide-supporting members omitted, and showing particularly the welding electrodes and their associated parts employed when a base of the single pin type is used.

Figure 7:
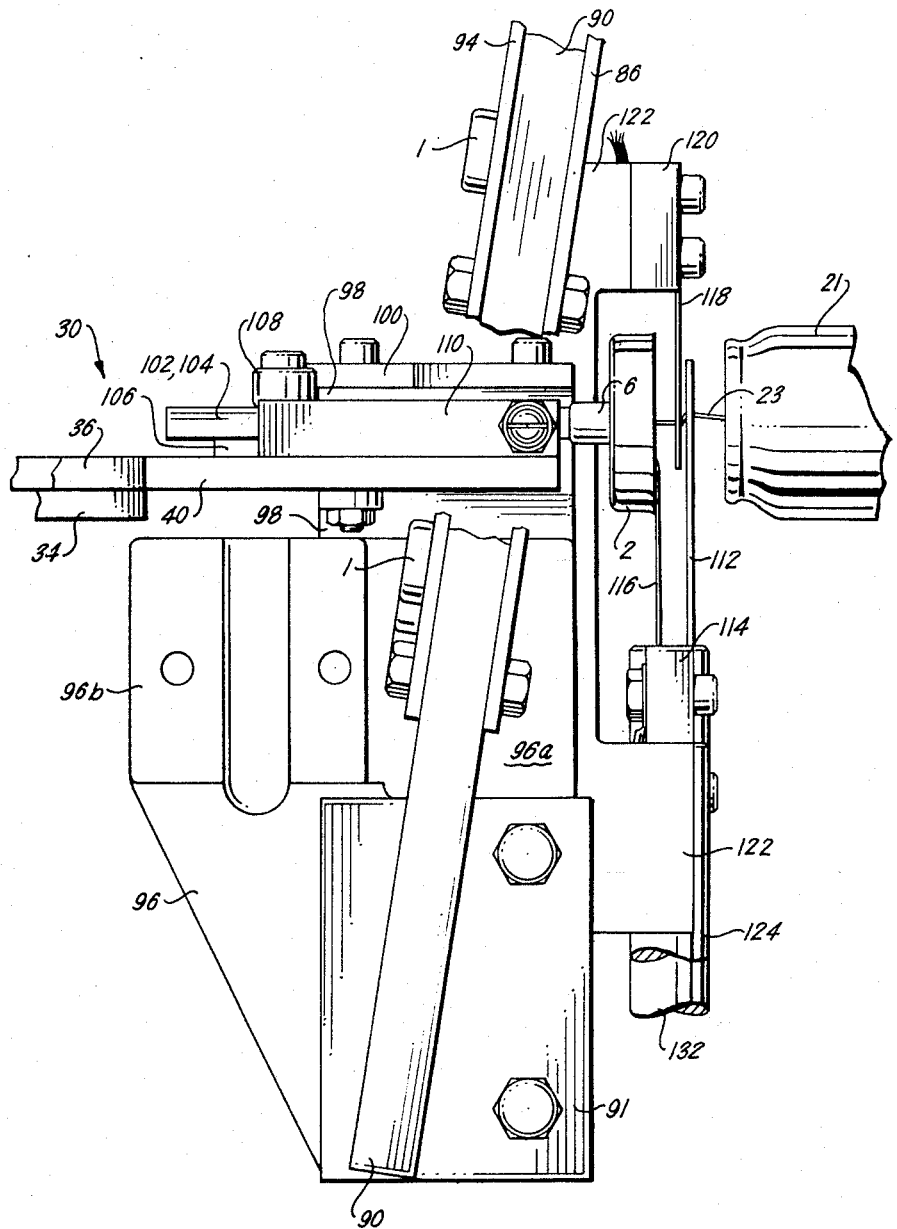
Figure 8:
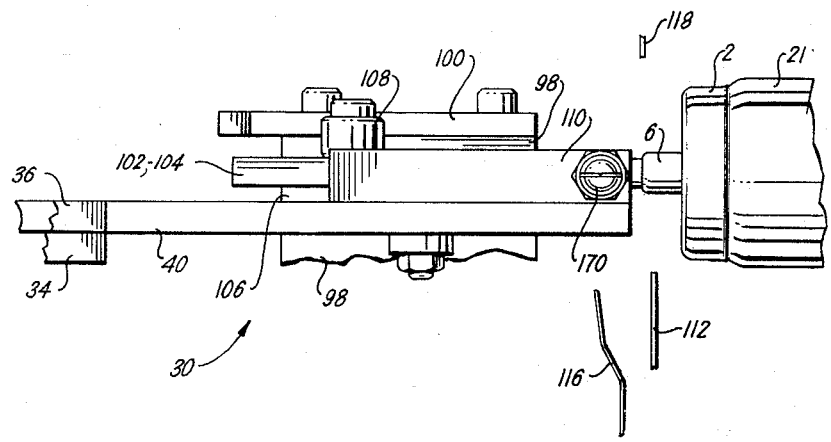
Figure 9:
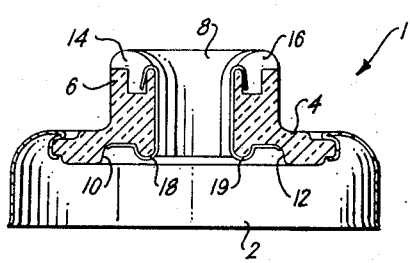
Figure 9 is a transverse sectional view of a base of the recessed double contact type used in the illustrations of the apparatus in Figures 1-4 and 6-8.

The specific embodiment of the apparatus of this invention as illustrated in Figures 1-4 and 6-8 is employed in welding bases of the recessed double contact type illustrated in Figure 9 and described and claimed in the co-pending application of Shappell et al., entitled "Lamp Base," Serial Number 637,196, filed January 30, 1957. However, the apparatus may be adapted by relatively simple modifications for use with other types of bases. For example, the welding electrodes and their associated parts on the slide assembly may be modified as illustrated in Figure 5 and described below for use with a base of the single pin type, such as the one shown in the co-pending application of Wiley et al. referred to above, or the one shown in the co-pending application of Shappell, Serial Number 763,622, filed September 26, 1958, for example. Minor modifications within the skill of the art may also be made to adapt the apparatus for use with bases of the bi-pin type, such as the base described and claimed in the co-pending application of Shappell et al., Serial Number 763,619, filed September 26, 1958, for example.

The apparatus of this invention may be disposed at a station along the path traversed by an indexing type of conveyor which carries the main article of work, such as the apparatus shown and described in U.S. Patent 2,721,373 to Midgley et al., which issued on October 25, 1955.

The welding circuit employed may be of the conventional type, such as the one illustrated in the co-pending application of Wiley et al. identified above. However, the circuit described and claimed in the co-pending application of Shappell, Serial Number 771,628, filed November 3, 1958, is preferable.

Figure 1:
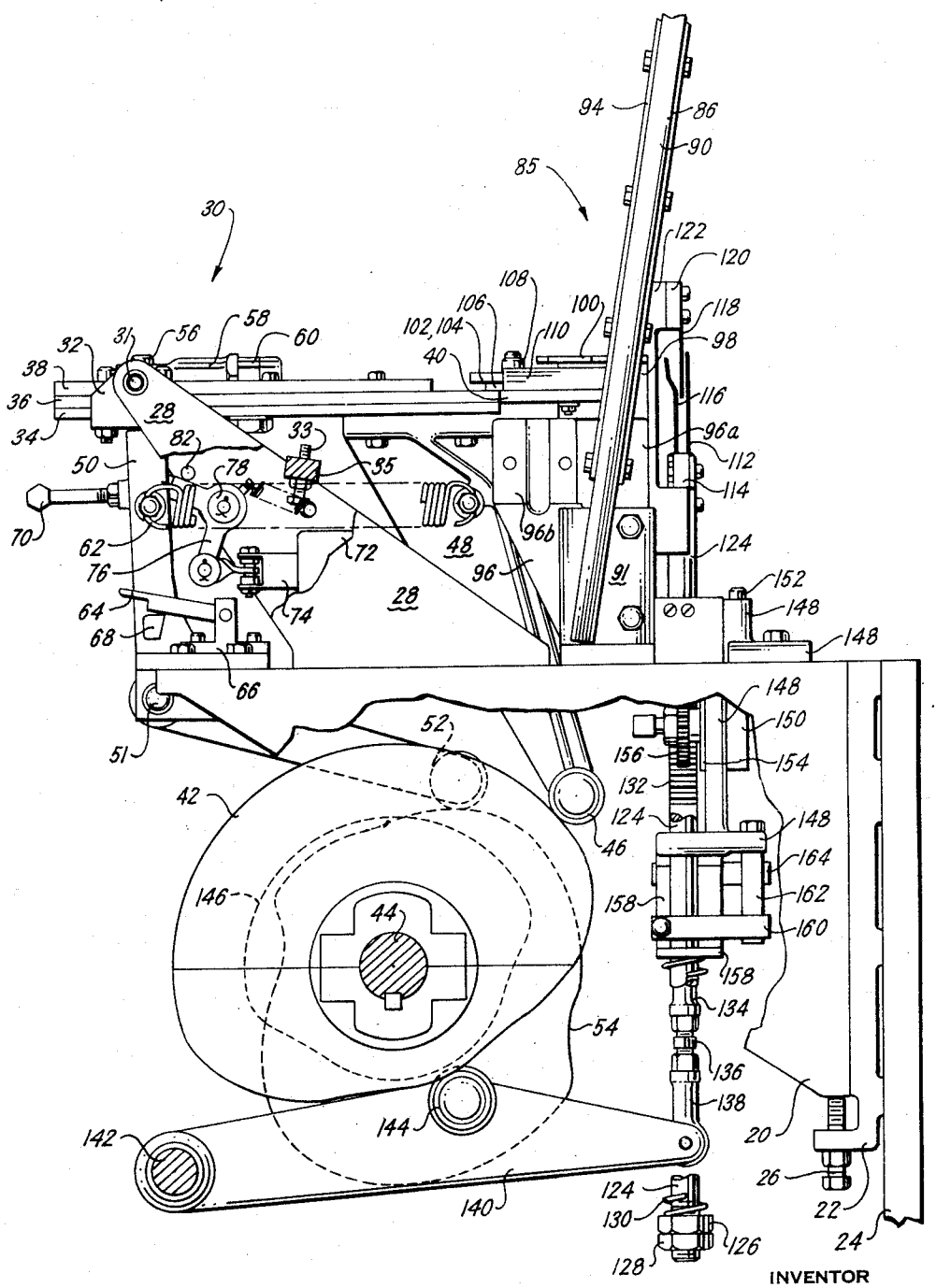
Figure 6:
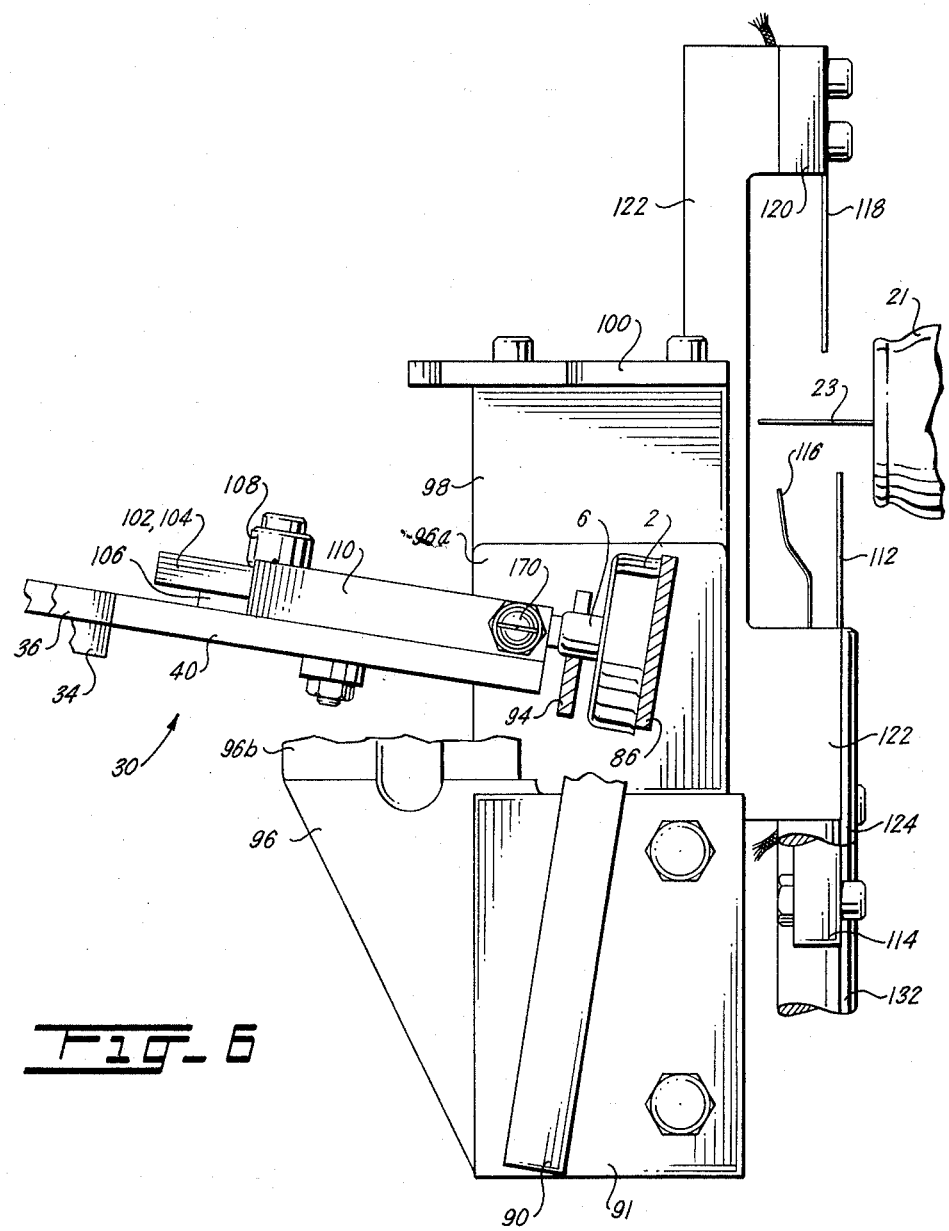
Figures 6, 7 and 8 are fragmentary side elevational views of the apparatus of Figures 1-4, illustrating the relative disposition of the members shown at various times during an operating cycle of the apparatus.

In the specific embodiment of the apparatus of this invention illustrated in the accompanying drawings, a slide assembly 30 (Figure 1) oscillates about a pivot 31 to move the slide 40 thereof, on which a pair of welding electrodes 102 and 104 which also serve as base-carrying members are mounted, between a pick-up (Fig. 6) and a delivery (Fig. 7) position. The slide 40 is reciprocably disposed within the slide assembly, reciprocation thereof being effected by lever 50 (Fig. 1). In the base pick-up position, the slide 40 advances to pick up a base (Fig. 6). In the base delivery position the slide advances to effect engagement of the members to be welded and to seat the base on the end of the lamp (Figs. 7 and 8). The lamp lead-in wires are connected to the welding circuit through a plurality of contact fingers 112, 116 and 118 (Figs. 3, 6, 7 and 8) which reciprocate into and out of engagement with the lead-in wires of the lamp in proper timed relationship with the operating cycle of the slide assembly 40.

Figure 2:
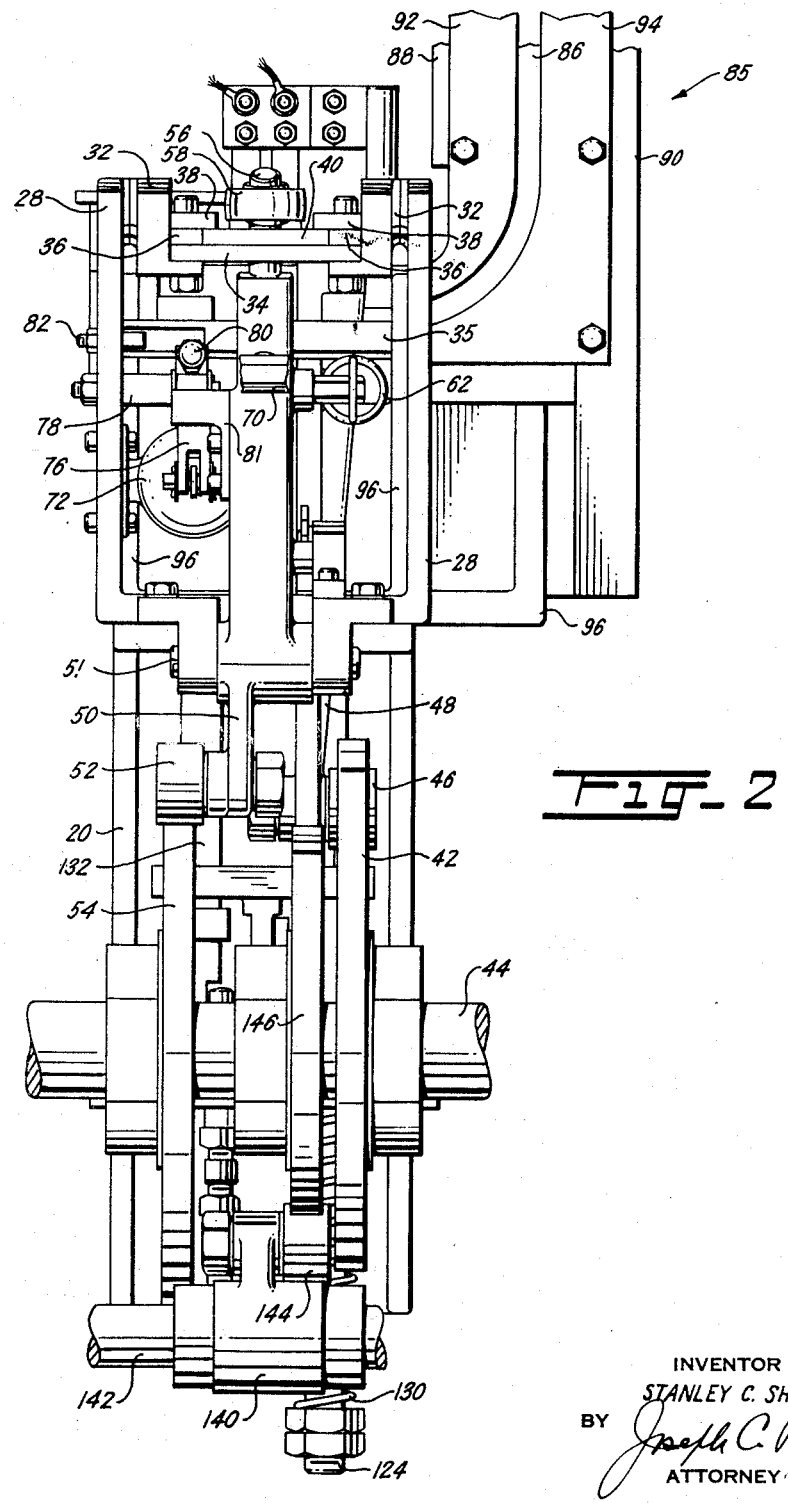
Figure 2 is a rear elevational view of the apparatus of Figure 1.

Referring now particularly to Figure 1, a platform 20, which serves as the primary base member on which the apparatus of this invention is supported, is adjustably mounted on frame plate 22 attached to pedestal 24, the screw 26 being provided for effecting the adjustment. A slide support 28, upstanding on the platform 20, supports a slide assembly, designated generally by the reference numeral 30, through a pair of pivot brackets 32 (Fig. 2). The slide assembly 30 comprises a bottom plate 34 attached to the pivot brackets 32, a pair of side plates 36 attached to the bottom plate 34, a pair of top plates 38 attached to the side plates 36, and a slide 40 disposed within the area bounded by these several plates.

The slide assembly 30 oscillates about its pivot 31, moving downwardly to base-receiving position and back upwardly to base-delivery position. Oscillation of the slide assembly 30 about its pivot 31 is effected by a cam 42 on cam shaft 44 through cam follower 46 on one end of arm 48, the other end of arm 48 being attached to the lower face of bottom plate 34 of the slide assembly. At the end of the downward stroke of the slide assembly 30, the bottom plate 34 thereof engages a screw 33 projecting upwardly through a transverse extension 35 of the slide support 28. By manipulating this screw 33, the position assumed by the slide assembly at the end of its downward stroke may be adjusted to insure accurate positioning of the slide 40 thereof with reference to the bases to be picked up.

Slide 40 reciprocates within the slide assembly 30 at the base-receiving position and at the base-delivery position to pick up a base and to deliver it, respectively. Retraction of slide 40 is effected by lever 50 pivotally mounted intermediate its ends at 51. A cam follower 52, on one end of lever 50, rides on cam 54 on cam shaft 44. The other end of lever 50 has a shaft 56 pinned thereto and upstanding thereon, by means of which the lever 50 is connected, through rod end 58 and bolt 60, to slide 40. The slide 40 and its associated lever 50 are shown in the retracted position in Figure 1, having been caused to assume this disposition by the cam 54. Advancement of slide 40 and its associated lever 50 is effected by spring 62 supported at its ends on lever 50 and arm 48, a load having been placed on spring 62 during the aforementioned retraction stroke.

Mindful of the fact that there are occasions when it is desirable to render the slide 40 inactive, i.e., to prevent it from picking up and delivering bases, manually-operated means are provided for so doing. A latch 64, pivotally mounted on a latch support 66, is engageable with a protuberance 68 on lever 50. A handle 70 is attached to the lever 50. To lock out the slide 40, the handle 70 is drawn rearwardly (to the left in Fig. 1) until the lever 50 has been displaced enough to permit the latch 64 to engage the protuberance 68. The spring 62 is thereby prevented from effecting advancement of the slide 40.

Automatic means are also provided for rendering the slide inactive. When, for some reason, no lamp is present to receive a base, no base should be picked up and delivered. A suitable sensing means, not shown but well known in the art, may be employed in combination with solenoid 72, the plunger 74 of which is normally in the "out" position as shown in Figure 1. Energization of the solenoid 72 by the aforementioned sensing means, which has detected the absence of a lamp coming into the base welding station, causes the plunger 74 thereof to move to the "in" position (to the right in Figure 1) thereby causing counter-clockwise rotation of a lever 76, to one end of which it is connected. Lever 76, pivotally mounted intermediate its ends on lug 78 (see also Fig. 2), is provided with a stop nut 80 on the other end thereof. Counter-clockwise rotation of lever 76 effects a displacement of the stop nut 80 from the position shown in Figure 2 to a position in register with and very close to the lateral extension 81 of lever 50, thereby preventing forward motion of the lever. A pin 82, extending inwardly from one of the sides of slide support 28, defines a stop limiting the clockwise rotation of lever 76 during the return thereof to its inactive position.

Lamp bases are fed along a track assembly (Figs. 1 and 2), designated generally by the reference numeral 85 and comprising a rear plate 86, side bars 88 and 90 and front plates 92 and 94. The side bar 90 is provided with a lateral extension 91 at one end thereof which serves as the means for supporting the track assembly 85. The lateral extension 91 of the side bar 90 is attached to a track support 96 mounted on platform 20. The track support 96 is provided with a pair of spaced mounting surfaces 96a and 96b disposed on opposite sides of slide assembly 30 and slightly therebelow. In Figures 1 and 2, bar cam mounting plate 98 is attached to mounting surface 96a. In modifications illustrated in other drawings and described below, a similar bar cam mounting plate is attached to the mounting surface 96b instead of 96a. A bar cam 100 is mounted on the top edge of the bar cam mounting plate 98 and overlies the slide 40 on which a pair of welding electrodes 102 and 104 are mounted. The electrodes 102 and 104 are insulated from the slide 40 by a plate 106 of insulating material. Welding electrode 102 has a roller 108 of insulating material upstanding thereon which rides along bar cam 100 during reciprocation of slide 40. A limiting block 110 of insulating material, the function of which will be described below, is mounted on the side of slide 40 opposite the bar cam 100.

Each of the welding electrodes 102 and 104, just described, engage an electrical contact member disposed in a lamp base. The lead-in wires extending from the end of a lamp envelope are engaged by electrical contact fingers which will now be described, reference being made particularly to Figures 1 and 3. A pair of notched electrical contact fingers 112 are attached to one face of a mounting plate 114 of insulating material, and a second pair of notched electrical contact fingers 116, each having an offset portion, are attached to the opposite face of mounting plate 114 and in register with fingers 112. A third pair of notched electrical contact fingers 118, attached to a mounting plate 120 of insulating material and depending therefrom, extend between and are spaced from the aforementioned first and second pair of fingers as shown in Figure 1.

The mounting plate 120 for the upper fingers 118 (Fig. 3) is attached to one end of a bracket 122. The other end of bracket 122 is attached to the upper end of a rack 124, the lower end of which is provided with nuts 126 and 128. A spring 130 concentric with the rack 124 seats on nut 126. The mounting plate 114 for the two pairs of lower fingers 112, 116 is attached to one end of a rack 132. The other end of rack 132 is connected through rod end 134, adjusting link 136 and rod end 138 to one end of a lever 140. The lever 140 is supported at its other end (Fig. 1) on a fulcrum shaft 142. A cam follower 144, supported on fulcrum shaft 142 intermediate the ends thereof, rides on cam 146 on cam shaft 44.

The racks 124 and 132 extend through and are reciprocable within a rack guide 148 which is mounted on platform 20 (Figs. 1 and 3). A mounting block 150 is adjustably supported by a screw 152 extending through and depending from an upper cross-arm of rack guide 148. A gear block 154, mounted on the inner face of mounting block 150, supports a gear 156 which meshes with both racks 124 and 132. Thus when the cam 146 on cam shaft 44 (Fig. 1) through cam follower 144 and lever 140, cause the rack 132 to move downwardly and withdraw the two pairs of lower electrical contact fingers 112 and 116 from engagement with a pair of lamp lead-in wires, the gear 156 translates the downward movement of rack 132 into upward movement of rack 124 to withdraw the pair of upper fingers 118 from engagement with the lead-in wires. This upward movement of rack 124 places a load on spring 130 (Fig. 3) which is disposed thereon and between nut 126 and a stop 158 attached to a depending portion of rack guide 148. An adjusting screw 159, depending from one end of a bracket 161 attached to rack guide 148, serves as a means for accurately adjusting the upper limit of the stroke of rack 132 (Fig. 3). Closing of the several pairs of electrical contact fingers 112, 116 and 118 with respect to the pair of lead-in wires is effected by the loaded spring 130, the rack 124 being pushed downwardly thereby, and the rack 132 being moved upwardly by gear 156 which meshes therewith and with rack 132.

Means are provided for preventing rotational displacement at the lower ends of racks 124 and 132 (Figs. 1 and 3). One end of a clamp 160 (Fig. 1) is attached to rack 124, the other end of the clamp being provided with a slot through which a guide rod 162, depending from and attached to a lower cross-arm of rack guide 148, extends. Similarly, one end of a clamp 164 is attached to rack 132, the other end of the clamp being provided with a slot through which a guide rod 166 (Fig. 3), depending from a lower cross-arm of rack guide 148, extends. Thus this clamp and guide rod arrangement permits the racks to reciprocate but prevents them from rotating.

Figure 4 is a plan view of the slide assembly 30, showing particularly the manner in which the welding electrodes 102 and 104 are disposed on the slide 40 thereof. Welding electrode 104 is fixedly mounted through bushings of insulating material on the slide 40, with the plate 106 of insulating material disposed therebetween. Welding electrode 102, on which the roller 108 of insulating material is mounted, is pivotally mounted on slide 40, through a bushing of insulating material, at 163. The welding electrodes 102 and 104 are provided with electrical terminals 165. A compression spring 168, extending between and seated within apertures provided therefor in the side faces of limiting block 110 and welding electrode 102, maintains the welding electrode 102 in a normally open position as shown. An adjusting screw 170, extending through limiting block 110 and abutting the adjacent side face of welding electrode 102, limits the extent to which the welding electrode can swing to the open position. As was mentioned above in the description of Figure 1, a bar cam 100, attached to mounting surface 96a, overlies welding electrode 104 and is engaged by roller 108 on welding electrode 102 during reciprocation of slide 40 to effect the desired oscillation of electrode 102 about its pivot 163 at the desired time as more fully explained below.

The slide assembly 30a in Figure 5 is substantially the same as the slide assembly 30 of Figure 4 except for modifications made to adapt it for use with lamps of the single pin type. The tips of welding electrodes 102a and 104a are shaped to receive and grip therebetween the pin of a single pin base. It will be noted that the relative position of the compression spring 168a and the adjusting screw 170a has been reversed as compared to the relative position of members 168 and 170 in Figure 4. This spring 168a maintains the welding electrodes 102a and 104a normally closed whereas spring 168 in Figure 4 maintains the welding electrodes 102 and 104 normally open. A bar cam, not shown, similar in function but different in contour, is attached to a bar cam mounting plate, not shown but similar to bar cam mounting plate 98 (Fig. 1), which is in turn attached to mounting surface 96b. Thus this bar cam overlies limiting block 110a and is engaged by roller 108a to effect the desired oscillation of welding electrode 102a about its pivot 163a during reciprocation of slide 40a.

A transverse sectional view of a base of the recessed double contact type is illustrated in Figure 9. The base 1 comprises an annular metal shell 2 and a disk 4 of insulating material secured thereto. The disk 4 is provided with a boss 6 of insulating material, preferably formed integral therewith, and being somewhat elliptical in shape. The disk 4 and the boss 6 are provided with aligned openings defining an aperture 8 extending through the disk-boss member. The inner face of the disk 4 is provided with cavities 10 and 12. The boss 6 is provided with a pair of pockets 14 and 16 recessed in the top thereof. The base is provided with a pair of metal, electrical contact strips 18 and 19, which may be silver plated if desired. The major portion of the strips 18 and 19 lie within the aperture 8, and the ends of the strips are bent to effect a seating of the strips within the disk-boss member.

One end of the strip 18 seats in cavity 10 and the other end thereof terminates in pocket 14. Similarly, one end of strip 19 seats in cavity 12 and the other end thereof terminates in pocket 16.

The fluorescent lamp 21, a fragmentary portion of which is shown in Figures 6-8, is of the conventional commercial type, i.e., one which is provided with a filamentary electrode disposed at each end thereof supported by a pair of lead-in wires 23 sealed in and extending through stems at each end of the lamp envelope.

The operation of the apparatus will now be described, reference being made primarily to Figures 6, 7 and 8, and to Figure 1 insofar as the driving means are concerned. In Figure 6, the slide assembly 30 is shown in the down or base-receiving position, with the slide 40 thereof advanced sufficiently to effect a disposition of the tips of the welding electrodes 102 and 104 within the aperture 8 of the boss 6 of the base and in firm frictional engagement with the metal contact strips 18 and 19 disposed therein. The downward movement of the slide assembly 30 has been effected by the cam 42 (Fig. 1), cam follower 46 and arm 48 attached to and depending from the lower face of bottom plate 34 of the slide assembly. The forward stroke of the slide 40 to advance the tips of the welding electrodes 102 and 104 into frictional engagement with the metal contact strips 18 and 19 of the base 1 to effect a gripping thereof has been effected by cam 54 through cam follower 52 and lever 50.

With the base 1 now held by the electrodes 102 and 104 of slide 40, the slide assembly 30 is returned upwardly to a position in axial alignment with the lamp 21. The three pairs of notched fingers 112, 116 and 118 are then advanced into position in engagement with the lead-in wires 23 of the lamp 21. Actuation of the several pairs of fingers to their closed positions is effected by the loaded spring 130 (Fig. 3) the cam 146 (Fig. 1) permitting the spring 130 to push the rack 124 downwardly. Downward movement of the rack 124 causes upward movement of the rack 132 through gear 156 which is disposed between and meshes with both racks.

It will be noted from an examination of Figure 6 that the pair of fingers 112 extend upwardly slightly higher than the pair of fingers 116. This factor, in combination with the length of the stroke of the racks 124 and 132, is such that a stretching and bending of the lead-in wires 23 to a position substantially as shown in Figure 7 is effected. This kinking of the lead-in wires has been found to be helpful in insuring the establishment of a good weld. It also insures buckling of the lead-in wires in a preferred, pre-determined direction to minimize the possibilities of accidental shorting when the base is advanced into engagement with the end of the lamp after welding has been effected.

With the welding electrodes 102 and 104 in firm electrical contact with the metal contact strips 18 and 19 in the base, and with the three pairs of fingers 112, 116 and 118 in firm electrical contact with the lead-in wires 23 of the lamp 21, the slide 40 is advanced to bring the inner ends of the strips 18 and 19 into engagement with the ends of the lead-in wires 23. This triggers the welding circuit. The slide 40 continues its inward motion until the weld has been completed.

Upon completion of the weld, the three pairs of fingers 112, 116 and 118 are retracted to permit further advancement of the slide 40 and positioning of the base on the end of the lamp, as shown in Figure 8. Actuation of the racks 124 and 132, to effect retraction of the several pairs of fingers, is accomplished by the cam 146 (Fig. 1) as described above.

With the welding operation completed and the several pairs of fingers 112, 116 and 118 retracted, the slide 40 advances to position the base on the end of the lamp. It will be noted from a comparison of Figures 7 and 8 that as the slide 40 advances during the final phase of its forward stroke, the roller 108 on the rear top face of electrode 102 rides along bar cam 100. The contour of bar cam 100 is such that it causes the electrode 102, through the roller 108, to swing counter-clockwise about its pivot 163 (Fig. 4), thereby bringing the tips of the electrodes 102 and 104 closer to one another and out of firm frictional engagement with the contact strips 18 and 19 in the base. This permits free withdrawal of the electrodes 102 and 104 from within the aperture 8 in the boss 6 of the base. The slide 40 is now retracted to accomplish this. When the slide 40 retracts, the roller 108 moves from the high to the low side of the bar cam 100 thus permitting the spring 168 (Fig. 4), on which a load was placed during the counter-clockwise rotation of electrode 102, to return the electrode 102 to its normal position parallel to the electrode 104. This completes the operating cycle of the apparatus.

As was mentioned above, the apparatus of this invention may be employed, with but few modifications, with bases other than those of the recessed double contact type. For example, when a single pin type of base is used, the slide assembly 30a shown in Figure 5 may be used. In this modification, the roller 108a, in cooperation with a bar cam similar in function but different in contour from the bar cam 100, causes the electrode 102a to swing clockwise about its pivot 163a to release a base from the grip of the electrodes 102a and 104a on the pin thereof during the final phase of the forward stroke of the slide 40a.

What I claim is:

1. Apparatus for welding a lead-in wire extending from an electrical device to an electrical contact member of a base interiorly thereof, said apparatus comprising: a first electrode, including means for gripping said base and engaging said electrical contact member of said base, said first electrode being one contact of a normally open welding circuit; a second electrode, movable into engagement with said lead-in wire intermediate the ends thereof, said second electrode being the other contact of said normally open welding circuit; means for moving said first electrode into gripping engagement with said base and into engagement with the said electrical contact member thereof; means for moving said second electrode into engagement with said lead-in wire intermediate the ends thereof; and means for effecting relative axial movement between said device and said base, toward one another, to cause the free end of said lead-in wire to engage said electrical contact member, whereby the said welding circuit through said first and said second electrodes is closed thereby and welding of the said lead-in wire to the said electrical contact member is effected.

2. Apparatus for welding a lead-in wire extending from an electrical device to an electrical contact member of a base interiorly thereof, said apparatus comprising: a first electrode, including means for gripping said base and engaging said electrical contact member of said base, said first electrode being one contact of a normally open welding circuit; a second electrode, movable into engagement with said lead-in wire intermediate the ends thereof, said second electrode being the other contact of said normally open welding circuit; means for moving said first electrode into gripping engagement with said base and into engagement with the said electrical contact member thereof; means for moving said second electrode into engagement with said lead-in wire intermediate the ends thereof; means for effecting relative axial movement between said device and said base, toward one another, to cause the free end of said lead-in wire to engage said electrical contact member, whereby the said welding circuit through said first and said second electrodes is closed thereby and welding of the said lead-in wire to the said electrical contact member is effected; and means for releasing said first electrode from gripping engagement with said base after said welding has been effected.

3. Apparatus for welding a pair of lead-in wires extending from an electrical device to a pair of electrical contact members of a base interiorly thereof, said apparatus comprising: a pair of spaced first electrodes substantially parallel to and insulated from one another, each member of said pair of first electrodes being one contact of a normally open welding circuit, and said pair of spaced first electrodes including means for gripping said base; a pair of second electrodes, each member thereof being engageable with one member of said pair of lead-in wires, and each member thereof being the other contact of one of said normally open welding circuits; means for moving said pair of first electrodes into gripping engagement with said base and each member thereof into engagement with one of said pair of electrical contact members of said base; means for moving each member of said pair of second electrodes into engagement with one member of said pair of lead-in wires intermediate the ends thereof; and means for effecting relative axial movement between said device and said base, toward one another, to cause the free end of each member of said pair of lead-in wires to engage one member of said pair of electrical contact members, whereby the welding circuit through each member of said pair of first electrodes and each member of said pair of second electrodes is closed thereby and welding of said pair of lead-in wires to said pair of electrical contact members is effected.

4. Apparatus for welding a pair of lead-in wires extending from an electrical device to a pair of electrical contact members of a base interiorly thereof, said apparatus comprising: a pair of spaced first electrodes substantially parallel to and insulated from one another, each member of said pair of first electrodes being one contact of a normally open welding circuit, and said pair of spaced first electrodes including means for gripping said base; a pair of second electrodes, each member thereof being engageable with one member of said pair of lead-in wires, and each member thereof being the other contact of one of said normally open welding circuits; means for moving said pair of first electrodes into gripping engagement with said base and each member thereof into engagement with one of said pair of electrical contact members of said base; means for moving each member of said pair of second electrodes into engagement with one member of said pair of lead-in wires intermediate the ends thereof; means for effecting relative axial movement between said device and said base, toward one another, to cause the free end of each member of said pair of lead-in wires to engage one member of said pair of electrical contact members, whereby the welding circuit through each member of said pair of first electrodes and each member of said pair of second electrodes is closed thereby and welding of said pair of lead-in wires to said pair of electrical contact members is effected; and means for releasing said first pair of electrodes from gripping engagement with said base after said welding has been effected.

5. In apparatus for welding a lead-in wire extending from an electrical device to an electrical contact member of a base interiorly thereof, in which a normally open welding circuit is closed to effect the weld by the engagement of said lead-in wire with said electrical contact member, the combination of: a first electrode, including means for gripping said base and engaging said electrical contact member of said base, said first electrode being one contact of said normally open welding circuit; means for moving said first electrode between a base receiving position and a base delivery position; a second electrode, movable into engagement with said lead-in wire intermediate the ends thereof, said second electrode being the other contact of said normally open welding circuit; means for moving said second electrode into and out of engagement with said lead-in wire intermediate the ends thereof; means for reciprocating said first electrode at said base receiving position to select a base from a supply thereof and to effect engagement thereof with said electrical contact member of said base; and means for advancing said first electrode at said base delivery position, while said second electrode is in engagement with said lead-in wire intermediate the ends thereof, to cause the said electrical contact member to engage the free end of said lead-in wire, whereby the said normally open welding circuit through said first and said second electrodes is closed thereby and welding of said lead-in wire and said electrical contact member to one another is effected.

6. In apparatus for welding a lead-in wire extending from an electrical device to an electrical contact member of a base interiorly thereof, in which a normally open welding circuit is closed to effect the weld by the engagement of said lead-in wire with said electrical contact member, the combination of: a first electrode, including means for gripping said base and engaging said electrical contact member of said base, said first electrode being one contact of said normally open welding circuit; means for moving said first electrode between a base receiving position and a base delivery position; a second electrode, movable into engagement with said lead-in wire intermediate the ends thereof, said second electrode being the other contact of said normally open welding circuit; means for moving said second electrode into and out of engagement with said lead-in wire intermediate the ends thereof; means for reciprocating said first electrode at said base receiving position to select a base from a supply thereof and to effect engagement thereof with said electrical contact member of said base; means for advancing said first electrode at said base delivery position, while said second electrode is in engagement with said lead-in wire intermediate the ends thereof, to cause the said electrical contact member to engage the free end of said lead-in wire, whereby the said normally open welding circuit through said first and said second electrodes is closed thereby and welding of said lead-in wire and said electrical contact member to one another is effected; and means for releasing said first electrode from gripping engagement with said base after said welding has been effected.

7. In apparatus for welding a lead-in wire extending from an electrical device to an electrical contact member of a base interiorly thereof, in which a normally open welding circuit is closed to effect the weld by the engagement of said lead-in wire with said electrical contact member, the combination of: a first electrode, including means for gripping said base and engaging said electrical contact member of said base, said first electrode being one contact of said normally open welding circuit; means for moving said first electrode between a base receiving position and a base delivery position; a second electrode, movable into engagement with said lead-in wire intermediate the ends thereof, said second electrode being the other contact of said normally open welding circuit; means for moving said second electrode into and out of engagement with said lead-in wire intermediate the ends thereof; means for reciprocating said first electrode at said base receiving position to select a base from a supply thereof and to effect engagement thereof with said electrical contact member of said base; and means for advancing said first electrode at said base delivery position, while said second electrode is in engagement with said lead-in wire intermediate the ends thereof, to cause the said electrical contact member to engage the free end of said lead-in wire, whereby the said normally open welding circuit through said first and said second electrodes is closed thereby and welding of said lead-in wire and said electrical contact member to one another is effected, and to further advance said first electrode, after said second electrode has been moved out of engagement with said lead-in wire, to place said base in engagement with said electrical device.

No references cited.